United States Patent [19]
Thompson

[11] 3,747,064
[45] July 17, 1973

[54] FET DYNAMIC LOGIC CIRCUIT AND LAYOUT

[75] Inventor: Gerhard R. Thompson, Mahopac, N.Y.

[73] Assignee: International Business Machines Corporation, Armonk, N.Y.

[22] Filed: June 30, 1971

[21] Appl. No.: 158,317

[52] U.S. Cl. .............. 307/205, 307/304, 317/235 G
[51] Int. Cl. .............. H03k 19/08
[58] Field of Search .............. 307/204, 205, 221, 307/251, 279, 304; 317/22.2

[56] References Cited

UNITED STATES PATENTS

| | | | |
|---|---|---|---|
| 3,523,284 | 8/1970 | Washizuka | 307/304 |
| 3,497,715 | 2/1970 | Yen | 307/304 |
| 3,259,761 | 7/1966 | Narud | 307/279 |
| 3,541,543 | 11/1970 | Crawford | 307/205 |
| 3,493,932 | 2/1970 | Yu | 307/304 |
| 3,566,153 | 2/1971 | Spencer | 317/235 |
| 3,648,066 | 3/1972 | Terman | 307/221 C |
| 3,638,036 | 1/1972 | Zimbelmann | 307/205 |
| 3,621,279 | 11/1971 | Jen | 307/221 C |

OTHER PUBLICATIONS

Parrish "Four–Phase High Speed Shift Register" Vol. 13, No. 1, 6–70 page 23–24, IBM Technical Disclosure Bulletin.

Jen "Dynamic FET Shift Register" Vol. 13, No. 5 10–70 IBM Technical Disclosure Bulletin page 1077.

Ho "Multimode FET Dynamic Shift Register" Vol. 13, No. 5 10–70 IBM Technical Disclosure Bulletin pages 1090–1091.

Dennard "MOSFET Array for a Read–Only Store" Vol. 10, No. 1 6–67 IBM Technical Disclosure Bulletin pages 77–78.

*Primary Examiner*—John W. Huckert
*Assistant Examiner*—R. E. Hary
*Attorney*—Grahm S. Jones, II et al.

[57] ABSTRACT

An MOS FET dynamic logic system includes six clock phase inputs. Interconnected FET logic curcuit stages are formed on a wafer substrate upon which plural parallel columns or stacks of diffusions have been placed. Generally, transverse metallization overlies the diffusions and usually crosses them at right angles with three clock lines crossing each set of diffusions. Successive stages are interconnected based upon rules which define phase relationships which are permissible for providing valid logic operations. Only one of a cyclically operating sequence of phase defining clocks is connected to each stage.

8 Claims, 12 Drawing Figures

INVENTORS
GERHARD R. THOMPSON
BY Graham S. Jones II
ATTORNEY

FET DYNAMIC LOGIC CIRCUIT AND LAYOUT

BACKGROUND OF THE INVENTION

1. Field of the Invention

This invention relates to integrated circuits and more particularly to field effect semiconductor circuits referred to as FET's.

2. Description of the Prior Art

Heretofore layouts of four phase FET circuits have usually required two clock inputs per stage of the system.

U. S. Pat. No. 3,475,621 of Weinberger shows an FET layout scheme for static circuits which is limited in application to static logic but shows a parallel diffusion pattern on the wafer, with interconnection metallization on a higher level. The interconnection and device areas of the system are overlapped so that the same area can be used for either an FET or for interconnections.

"Four Phase High Speed Shift Register" by Parrish and Terman, IBM Technical Disclosure Bulletin Vol. 13, No. 1, June 1970, p. 23, shows a four phase dynamic shift register with one clock input per stage, but which is limited to use as a shift register.

"A Low-Power Multiphase Circuit Technique" by B. G. Watkins, IEEE Journal of Solid-State Circuits Vol. SC-2, No. 4, Dec. 1967, p. 213–220, N.B. p. 216–219, shows 6 phase shift register techniques in MOS circuits with multiple clock inputs per stage.

Prior four clock phase systems include charge transfer difficulties which include three problems, usually referred to as "charge-sharing," "clock phase to input coupling," and "capacitive gain." They are as follows:

a. Charge-sharing. In conventional dynamic logic schemes, an isolation device is used to maintain a valid output, even though an input has been precharged. However, such input precharging may cause a redistribution of the output charge prior to, or during, the sampling of the output by the following circuit. The charge-sharing may reduce the output voltage to the point where it cannot fully discharge the following circuit, causing a logic error.

b. Clock phase to input coupling (sometimes called "data low coupling"). In conventional data low dynamic logic when an input driving two successive stages is at a down-level (which is applied to the gates of the two stages), the precharge phase of the second stage can couple through capacitance of the second gate to the common input line and thus the first gate causing it to go high and partially discharge the first stage. Data low coupling is defined as a series connection of three or more FET devices where the upper two devices are connected to clock phases and the lowest gate is connected to a data source. The unconnected diffusion of the lowest device is connected to a clock phase also.

c. Capacitive gain. This problem arises in conventional logic when the output node couples to an input through gate to drain capacitance. Thus, discharging of an ouptut of a stage causes corresponding variation of the potential at the input concerned. Layout in four phase logic systems (devices other than memories or shift registers) has been complicated in the past because at least two clock inputs have been requred per stage for most stages of each system.

SUMMARY

In accordance with this invention random, i.e., nonsequential, logic interconnections between phase activated FET logic stages are possible, where the sequence is defined by a series of phase intervals during which successive clock phase pulses can be generated. In a sequentially-connected circuit the output of a first stage is connected to the input of a second stage whose clock phase pulse occurs immediately before the clock phase pulse which actuates the second stage.

Further in accordance with this invention, a set of field effect transistor circuits are formed upon a single semiconductor substrate of a first conductivity type. These circuits include several diffusions of a semiconductor material of opposite conductivity type upon the substrate in substantially parallel relationship. Several clock phase lines are provided having a transverse relationship with respect to the diffusions. Several coupling lines are provided and the clock phase lines and coupling lines are superposed upon the diffusions. Preferably the circuit includes several stages, with only one clock phase line connected to each stage. It is also preferred that the clock phase lines cross the diffusions between opposite ends thereof.

In another aspect of this invention, an FET circuit configuration includes several clock phase input lines adapted to be connected to a plurality of clock phase signals supplied in a cyclical fashion with $n$ clock phase intervals per cycle where $n \geq 5$, with only one clock phase signal occurring for each such interval with a first stage of the circuit connected to a first clock phase signal. The output of the first stage is connected to the input of a second stage which is to be connected to a clock phase signal occuring $\alpha$ clock pulse intervals later than the first clock phase signal. Value $\alpha$ is an integer greater than zero and less than b clock pulse intervals. Value $b$ is an integer greater than $\alpha$ and less than or equal to $n-2$.

In another aspect of this invention, a plurality of semiconductor circuits are provided on a single substrate, along with several clock lines and several clock line terminals. Time is divided into a cyclical pattern of n clock phase intervals where n is an integer greater than 4. Only one clock line is connected to each of said circuits with the output of the circuit being connected to circuits controlled by different clock lines with the clock lines having a modulo $n$ cyclical sequence of clock phases with the output of a first circuit connected to the input of a second circuit having a clock phase signal which occurs $\alpha$ clock phase intervals later. Value $\alpha$ is an integer greater than zero and less than $b$, where $b$ is an integer less than or equal to $n-2$ and greater than zero. The output of the second stage is connected to the input of a third stage having a clock phase signal which occurs $b$ clock phase intervals later. Value $n$ is the modulo number of the phase in the system.

A set of field effect transistor circuits is formed upon a single semiconductor substrate of a first conductivity type comprising a plurality of columns of diffusions of a semiconductor material of opposite conductivity type upon said substrate whereby the diffusions within each column are in substantially parallel relationship. A plurality of clock phase lines are provided in transverse relationship with respect to said columns of diffusions. A plurality of coupling lines are also provided. The clock phase lines and coupling lines are superposed upon the diffusions.

In another aspect of this invention, a set of FET circuits are connected to form separate stages. A plurality of clock phase lines are used. At least two FET devices are included in each stage and a single one of said clock phase lines is connected to each stage. At least two interconnected stages are connected to clock phase lines upon which pulses occur during intervals which are non-consecutive. Preferably each stage includes an FET device having its gate and one other electrode connected to one of said clock phase lines and having its third electrode connected at a junction to an electrode other than the gate of a second FET device with the gate of the second FET device adapted to be connected to a source of data. Preferably the junction is adapted to be connected to the gate of another stage.

Alternatively, an FET device has one of its electrodes other than its gate connected to the clock phase line and the remaining one of its electrodes connected in a series circuit with the third electrode of the first FET.

A stage is defined herein as an FET logic unit which has a single output which can be employed to drive or is capable of being connected to the gate of a subsequent FET device such as another stage. In addition, a stage must include at least two FET devices, one of which is clocked by a phase pulse and a remaining one of which is adapted to be gated by data signals as contrasted with phase pulse signals. A circuit as used here includes one or more interconnected stages.

The five or more and preferably six clock phase scheme of this invention offers several advantages over four phase systems:

1. The principal advantage is the elimination of charge transfer problems. The charge sharing problem referred to above is eliminated with the five or six-phase system of this invention since the output is not considered valid while inputs are precharging. In other words, the input never goes from a discharged level to a precharged level while the output is valid. Thus logical errors attributable to this problem are avoided. The clock phase to input coupling problem is usually eliminated in mutli-phase systems of five or more phases or phase intervals because the discharged input level is maintained by a driving circuit during any such coupling, thereby discharging the coupled stage. In the six-phase system the capacitive gain problem is solved because the output of every circuit is usually discharged before precharge and always is discharged for NOR circuits.

2. A second advantage of the multi-phase system is that it is simple to lay out the circuit elements on a chip.

3. The circuit dealy in multi-phase systems can be shorter than in four phase systems because of the absence of a sampling device. Hence, once precharge is completed, there is no delay in the initiation of sampling and the output discharge does not have to pass through a series sampling device.

4. Sampling of an output begins after precharge and continues until an input is precharged. It is therefore possible to connect circuits so that those discharging slowly have more than one phase time to do so and thus the sample time is not limited to a single phase time.

5. Each multi-phase stage has one less device than the corresponding four-phase stage.

BRIEF DESCRIPTION OF THE DRAWINGS

FIG. 1 shows an MOS FET six stage inverter n channel system which is operated by six clock phase signals including $\phi_1$ applied to phase signal lines 10, 10$^1$, $\phi_2$ applied to lines 19, 19$^1$, $\phi_3$ applied to lines 31, 31$^1$, $\phi_4$ applied to lines 39, 39$^1$, $\phi_5$ applied to lines 50, 50$^1$, $\phi_6$ applied to lines 58, 58$^1$. The relative timing relationships between the clock phase signals is shown in FIG. 2. The six clock phase signals are recurrent; they substantially do not overlap, so only one pulse is positive at a time; and they are consecutive, preferably substantially without intervening gaps. Each of the timing intervals $T_0$ to $T_6''$ includes just one of the clock phase signals. Some systems could omit one or more clock phase signals if they are unnecessary in a particular circuit. When the clock phase signal $\phi_1$ is positive at phase lines 10, 10$^1$ (which are connected together by means not shown), from time $T_0$ to $T_1$ as indicated at 52 in FIG. 2, then stage 11 composed of FET's 12 and 13 is "precharged." The drain and gate of FET 12 are connected to terminal 10. The source of FET 12 and the drain of FET 13 are connected to output 14. The source of FET 13 is connected to line 10$^1$. The gate of FET 13 is connected to a terminal by input line 9. Stage 11 is precharged in the sense that output 14 connected to the source of FET 12 and drain of FET 13 is at a positive potential, and the stray capacitances on the output 14 are charged during that interval. After precharging has continued long enough to approach completion the input potential at lines 10, 10$^1$ returns to a lower, quiescent potential value (53) at time $I_l$. The subsequent potential at output 14 depends upon the potential at input line 9. If input line 9 is at a higher potential, the output line 14 will discharge rapidly, after precharge ends, through FET 13 which is gated on by the positive input. The output 14 is connected to the input 17 of stage 18 which includes FET's 20 and 21 connected (similarly to FET's 12 and 13) between lines 19, 19$^1$.

Figure 1:
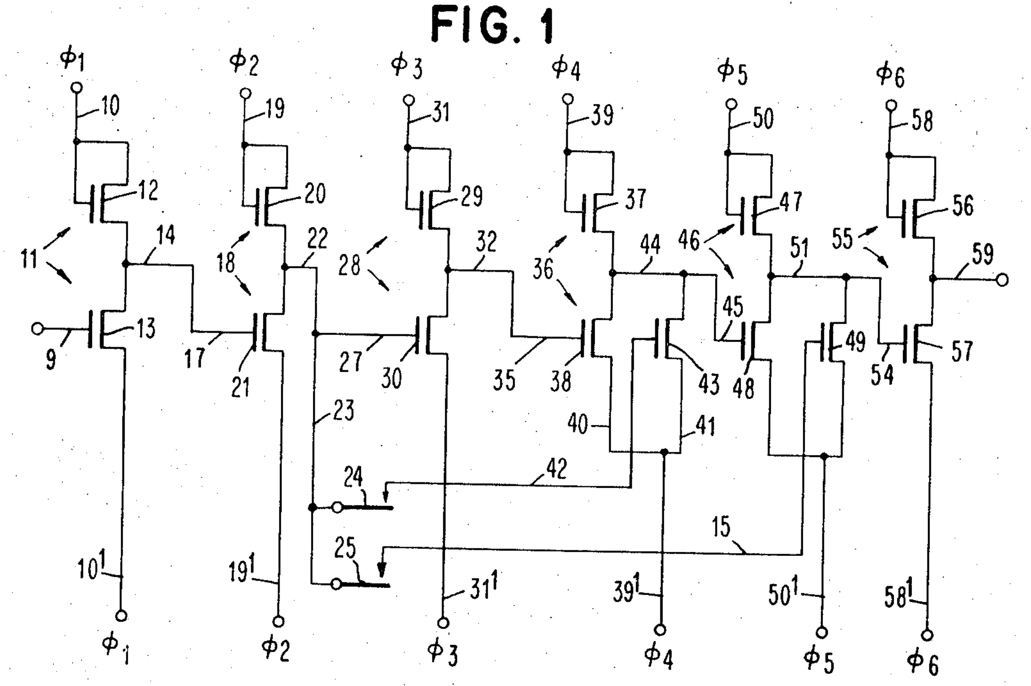
FIG. 1 shows a six clock phase FET dynamic circuit with some alternative interconnections between stages.

Precharging the input 17 of FET 21 grounds the output 22 of stage 18. This occurs when $\phi_1$ is positive. The output 32 of a third FET stage 28 will not be affected by precharging of input 17 by $\phi_1$ and thus the output 32 will remain valid unitl second stage 18 is being precharged by clock phase signal $\phi_2$.

Figure 3A:
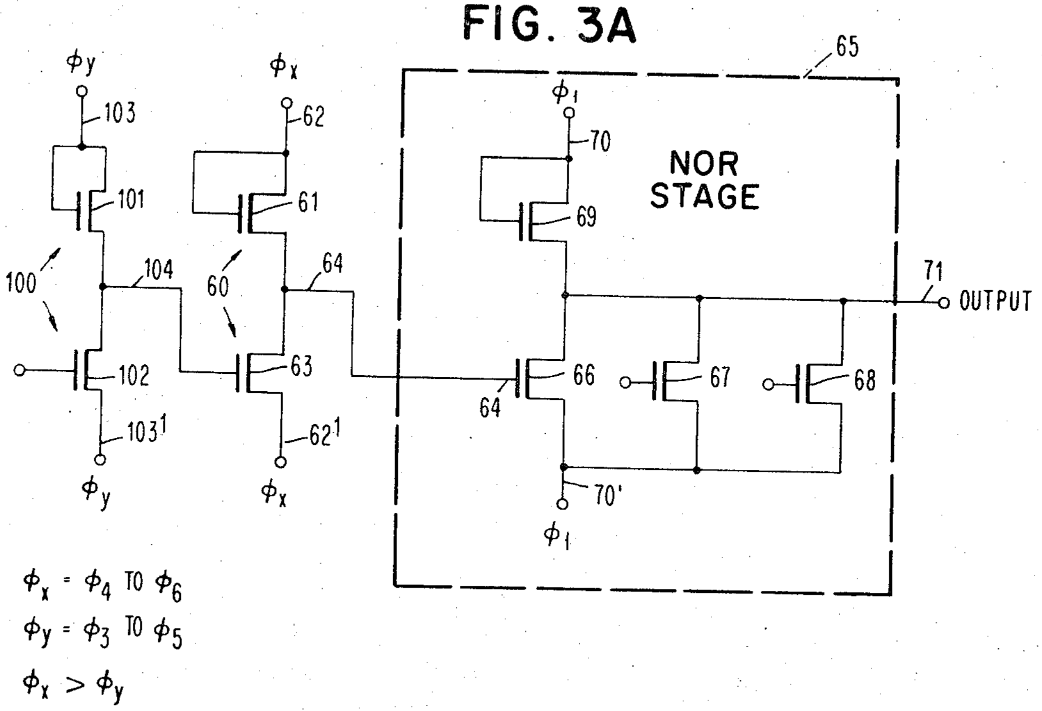
FIG. 3A shows another FET circuit and illustrates the possible interconnection relationships between phases for a six phase system.

Reference is made here to FIG. 3A for the purpose of illustrating the relationship of precharging to the effect upon succeeding stages in response thereto. The circuit includes an FET inverter stage 100 including FET's 101 and 102 having a drain and a source respectively to be driven by clock phase signal $\phi_y$ through lines 103, 103[1]. The gate of FET 101 is connected to line 103. Te output 104 of circuit 100 is connected to the input of inverter 60 which is driven by clock phase $\phi_x$. The range of clock phases for a six phase dynamic system is that $\phi_x$ may be selected from $\phi_4$ to $\phi_6$ and $\phi_y$ may be selected from $\phi_3$ to $\phi_5$ so long as the value $x$ for $\phi_x$ exceeds the value of $y$ for $\phi_y$. That is, the $\phi_x$ pulse should occur later than the $\phi_y$ pulse assuming the input to stage 100 comes from a $\phi_2$ circuit. An inverter stage 60 includes FET 61 with its gate and drain connected to phase $\phi_x$ line 62, and with its source and the drain of FET 63 connected to output line 64. The source of FET 63 is connected to $\phi_x$ line 62[1] (connected to line 62 by means not shown).

Line 64 is connected to the input of FET NOR stage 65 with FET's 66, 67, and 68 all having sources connected to $\phi_1$, line 70[1] and FET 69 having its drain connected to line 70 and the remaining drains and source of those FET's connected to output line 71. The gate of FET 69 is connected to $\phi_1$ line 70.

Figure 3B:
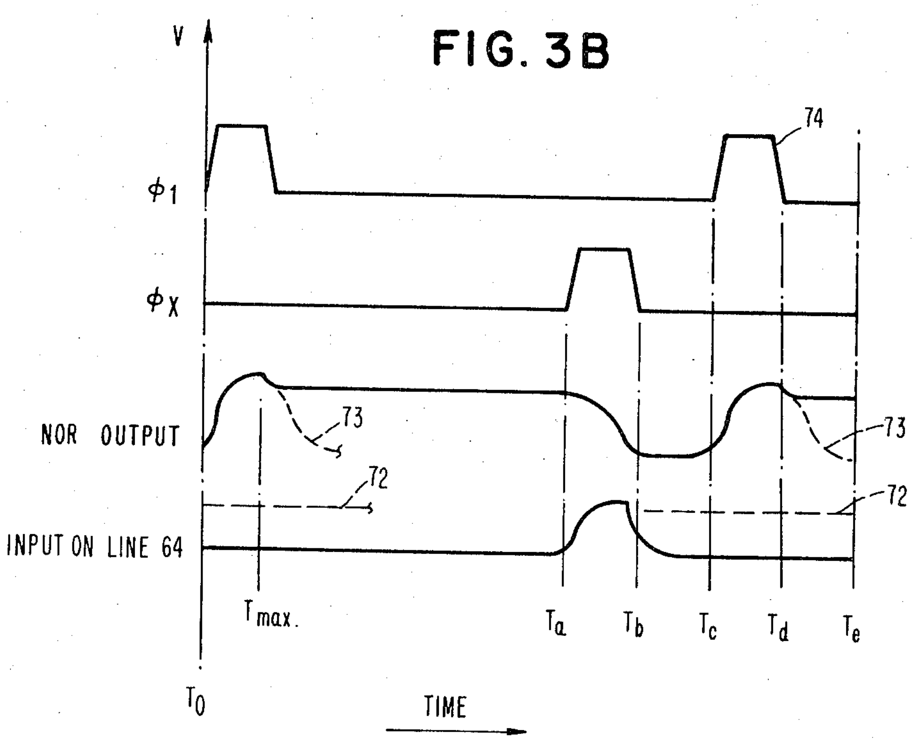
FIG. 3B shows the phase relationships between certain potentials as a function of time in FIG. 3A.

FIG. 3B shows the voltage versus time traces for voltages $\phi_1$, $\phi_x$, the NOR output on line 71, and input on line 64 respectively. Initially, line 64 (solid line) is at a low potential and $\phi_1$ raises line 71 to precharge it from time $T_0$ to $T_{max}$ when the NOR output 71 reaches a maximum maintained until time $T_a$ when voltage $\phi_x$ begins to rise in potential during a $\phi_x$ timing pulse. The precharge on line 64 causes the NOR output to decline as the gate of FET 66 turns FET 66 on to permit the line 71 to return essentially to ground potential at time $T_b$ when the $\phi_x$ pulse has ended. The output of NOR stage 65 remains invalid from $T_b$ to $T_e$ during which time from $T_c$ to $T_d$ it precharges in response to another $\phi_1$ pulse 74. It should be allowed sufficient time for possible discharge from $T_d$ to $T_e$ (dotted line). Thus, the output 71 of the NOR stage 65 remains as set, or valid from time $T_e$ until the next time the preceding stage 60 is pulsed by a $\phi_x$ pulse to precharge line 64.

There are three time intervals when the output of a circuit is not logically valid in the sense that the data to be represented is obscured by dynamic circuit operations. The first such interval (precharge) is during precharge such as when NOR output 71 is changing between $T_0$ to $T_{max}$ and $T_c$ to $T_d$. The second interval (conditional discharge) is immediately after precharge as shown by dotted lines 73 for the positive potential dotted line input 72 on line 64 until the output 71 can be discharged if input 64 happens to have been charged previously as from $T_d$ to $T_e$. There is a third interval (unconditional discharge) from the time $T_a$ that the input (64) to the NOR stage (65) is precharged until its output (71) begins to be precharged $T_c$. Thus, if another $\phi_1$ pulse is to follow $\phi_x$ as shown by pulse 74 then an interval from $T_a$ to $T_e$ or the equivalent of at least three successive phase pulse intervals will expire before NOR 65 can be said to be in a logically valid condition. In other words, if $\phi_x$ (where $x$ is the highest phase) immediately precedes $\phi_1$ with no time gap $T_b$ to $T_c$ it will be a duration of 3 phase intervals. The earlier the first phase pulse $\phi_x$, the longer the hiatus during which the output is invalid. This hiatus increases in length by the number of time intervals in the gap between phase $\phi_x$ and subsequent phase $\phi_1$.

Referring again to FIG. 1, considering stage 18, its input 17 will be in precharge from $T_0$ to $T_1$. From $T_1$ to $T_2$, its input will be in the unstable state of possible discharge of output 14 since the $\phi_1$ pulse has then ended and if input 9 is high, then line 14 will be discharging. Then too, the $\phi_2$ pulse from $T_1$ to $T_2$ will precharge the output 22 of circuit 18 which is connected to the input 27 of FET stage 28. Then, during the interval $T_2$ to $T_3$ in FIG. 2, while the $\phi_3$ pulse is occurring, the stage 18 will be in a possible condition of discharge if input 17 of stage 18 is positive. It will not be possible for the state of stage 18 to be considered stable until the interval $T_3$ to $T_4$ and stability will remain during the time from $T_3$ to $T_6$.

The remainder of the circuit of FIG. 1 includes input 35 to stage 36 which is connected to output 32 of stage 28. Stage 36 includes FET's 37, 38 and 43, all of which are connected to phase lines 39, 39[1] for $\phi_4$ signals. The source of FET 37 and the drains of the FET's 38 and 43 are all connected to output line 44. The gate of FET 43 is connected through line 42, switch 24, and line 23 to output 22 of FET stage 18.

Input 45 of FET 48 of stage 46 is connected to output line 44. Stage 46 includes FET 47 whose drain and FET's 48 and 49 whose sources are connected to $\phi_5$ through lines 50, 50[1] and whose respective source and drains are connected to output line 51. The gate of FET 49 is connected through line 15 and switch 25 through line 23 to output 22 of stage 18.

Input 54 of FET 57 of stage 55 is connected to output 51. Stage 55 includes FET's 56 and 57 which are connected through phase lines 58, 58[1] to $\phi_6$ clock pulses. The source of FET 56 and the drain of FET 57 are connected to output 59. With switches 24 and 25 open, the states of the various stages will be as follows:

*D* = Down (Due to precharge of input — Unconditional Discharge)

*P* = Precharge (Regardless of input)

*CD* = Conditional Discharge (Depends upon input)

*V* = Valid up or down

TABLE I

Output of Stage

| | | | | | | | | | | | | |
|---|---|---|---|---|---|---|---|---|---|---|---|---|
| 6 | CD | V | V | V | D | P | CD | V | V | V | D | P |
| 5 | V | V | V | D | P | CD | V | V | V | D | P | CD |
| 4 | V | V | D | P | CD | V | V | V | D | P | CD | V |
| 3 | V | D | P | CD | V | V | V | D | P | CD | V | V |
| 2 | D | P | CD | V | V | V | D | P | CD | V | V | V |
| 1 | P | CD | V | V | V | D | P | CD | V | V | V | D |
| | 1 | 2 | 3 | 4 | 5 | 6 | 1 | 2 | 3 | 4 | 5 | 6 |

Figure 2:
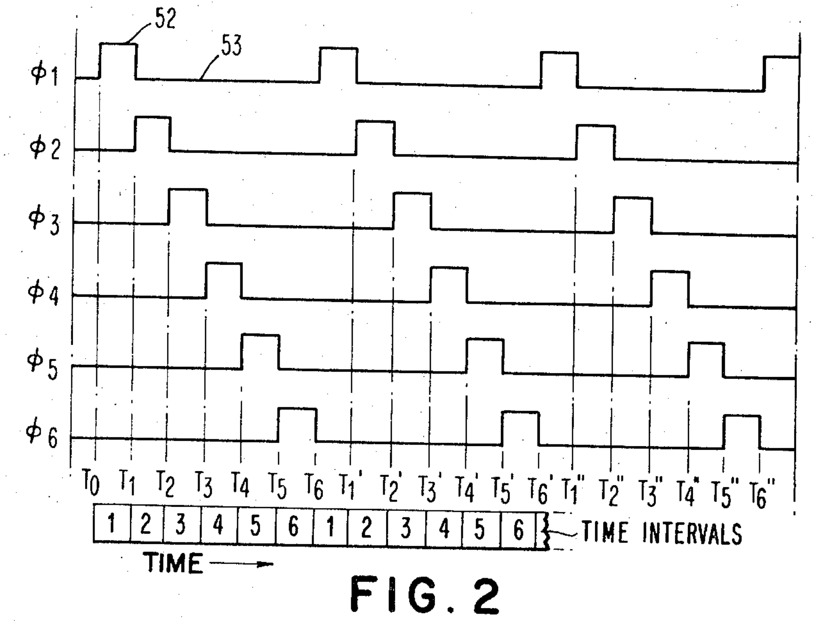
FIG. 2 shows the type of clock phase wave forms employed to control the circuits of FIGS. 1, 3A, 4, 5, 6A, 6B, 7, 8, and 9.

Time Interval (correspond to phase pulses in FIG. 2)

However, by closing switch 24, which is included here simply for purposes of illustration, during time interval 2 in FIG. 2 the stage 18 is precharged, which will precharge the output line 22 and the input to the gate of FET 43 so that the condition of output 44 will not be valid for time intervals 2. Since FET 49 is connected through lines 15 and switch 25 (when closed) to output 22 also, the output of stage 46 will be valid for interval 1 and will not be valid during intervals 2 and 3 when it would have been valid if switch 25 were open.

Figure 4:
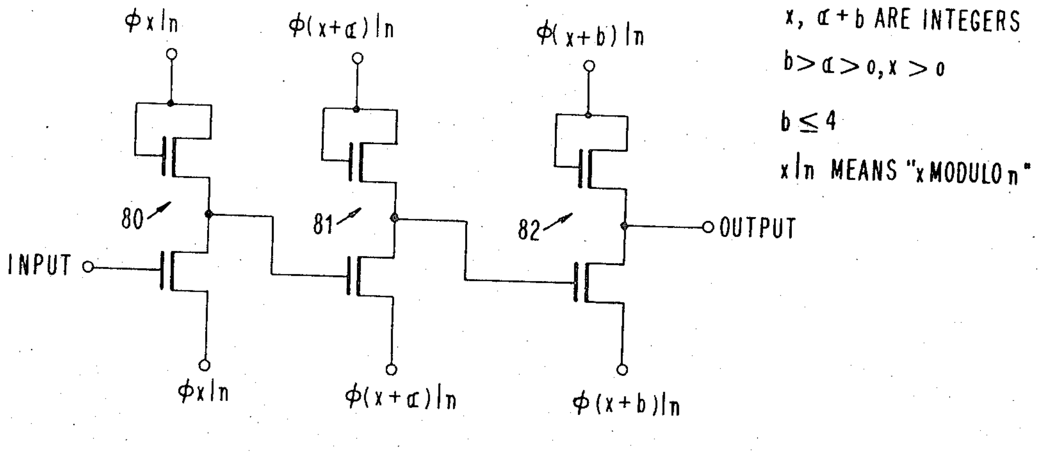
FIG. 4 shows a three stage inverter circuit which illustrates the general rules for interconnection of stages in accordance with this invention. Formulas defining the rules are shown.

Referring to FIG. 4, the rules for interconnection of succeeding stages are shown with equations on the right assuming that there are six clock phase intervals in a cycle of the system. An inverter stage 80 has its output connected to the input of inverter stage 81 whose output is connected to the input of inverter stage 82. Assuming $x$ is 1, then stage 80 is connected to $\phi_1$ clock phase signals. If b is 3 (which is less than or equal to 4 as required by the equation in FIG. 4) then stage 82 is driven by clock phase signal $\phi_4$. Since $\alpha$ must be less than $b$ and greater than zero, it can be 1 or 2 which means $x + \alpha$ is either 2 or 3. We will assume that $\alpha$ equals 1, so that the clock phase signal for stage 81 is $\phi_2$. If $n$=6, then the modulo values will be 6 as in FIG. 1 and the Table I would apply to some extent. The term "modulo" is employed here to refer to repetition of the same sequence for example with the beginning of the next cycle following the end of the present cycle. For modulo 6, Table II is included here to show a more general relationship depending upon the form of interconnection provided.

$D$ = Down $P$ = Precharge (regardless of input)

$CD$ = Conditional Discharge $V$ = Valid (Up or down depending on input at previous clock time)

| Output of stage | | | | | | | |
|---|---|---|---|---|---|---|---|
| 6 | CD | V | * | * | D | P | CD |
| 5 | V | * | * | D | P | CD | V |
| 4 | * | * | D | P | CD | V | * |
| 3 | * | D | P | CD | V | * | * |
| 2 | D | P | CD | V | * | * | D |
| 1 | P | CD | V | * | * | D | P |
| | 1 | 2 | 3 | 4 | 5 | 6 | 1 Time Interval |

*Valid or not depending on whether input precharged by virtue of logic connection.

TABLE II

Figure 5:
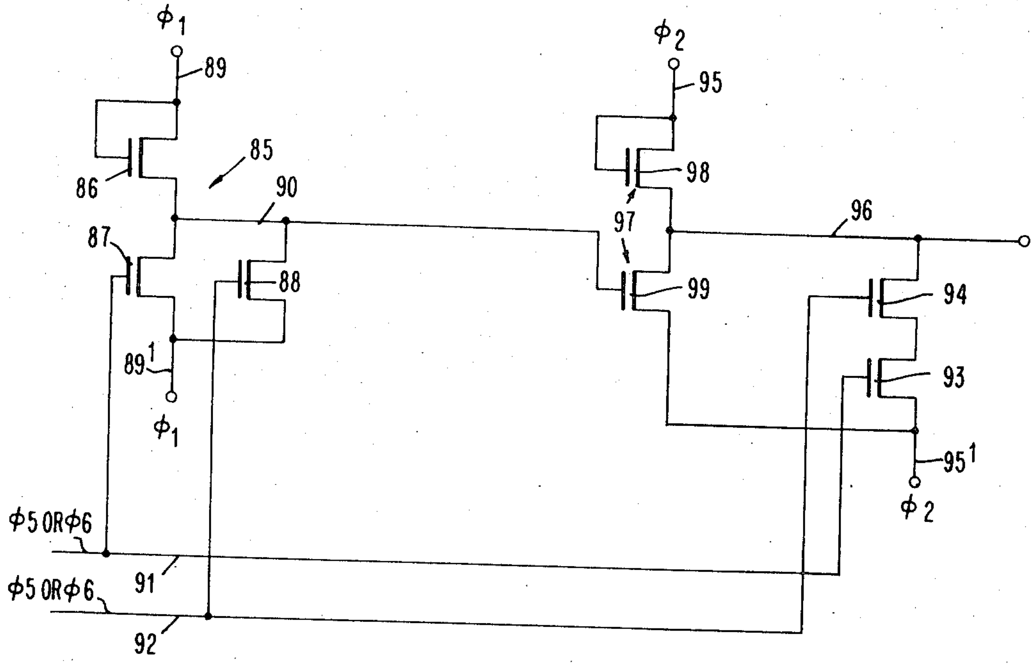
FIG. 5 shows an EXCLUSIVE OR circuit designed in accordance with this invention.

FIG. 5 shows an exclusive OR unit which requires a system including at least a five clock phase interval system to operate. The first phase stage 85 includes FET 86 whose drain and FET's 87 and 88 whose sources and the gate of FET 86 are connected to phase $\phi_1$ lines 89, 89$^1$ and whose respective source and drains are connected to output 90. The inputs 91 and 92 are connected to FET 87 and FET 88 respectively and also to second stage FET 93 and FET 94 respectively which comprise an FET AND circuit connected in series between $\phi_2$ line 95$^1$ and output 96 of FET circuit 97 included in the second stage. Circuit 97 also includes FET 98 having its drain and gate connected to $\phi_1$ line 95 and FET 99 having its source connected to line 95$^1$ and its gate connected to line 90. With a four clock phase intervals system, if a phase $\phi_4$ circuit's output were to supply the input to lines 91 and 92 it would be in a condition of unconditional discharge during $\phi_3$ so the output of the stage 97 would be invalid. Thus $\phi_5$ or $\phi_6$ must be used.

Figure 6A:
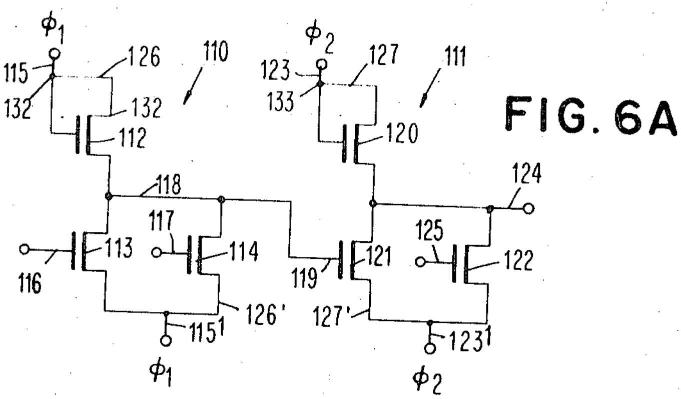
FIG. 6A shows two interconnected NOR circuits designed in accordance with this invention.
Figure 6B:
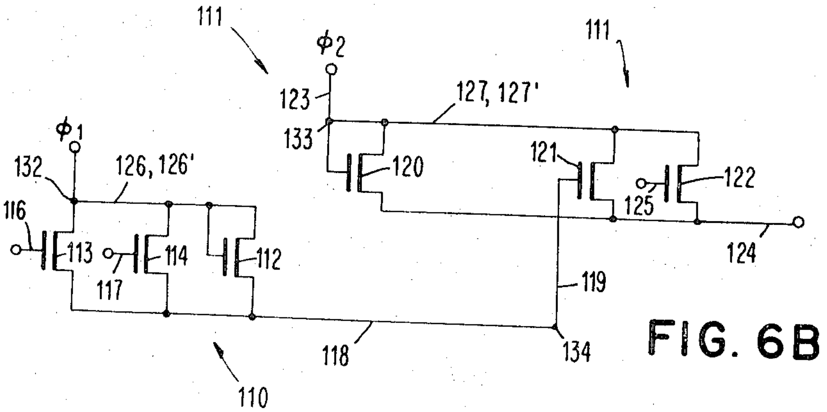
FIG. 6B is the same circuit as the circuit shown in FIG. 6A rearranged for the purpose of correlation with a physical embodiment of FIG. 6A and FIG. 6B which embodiment is shown in plan view in FIG. 6C.
Figure 6C:
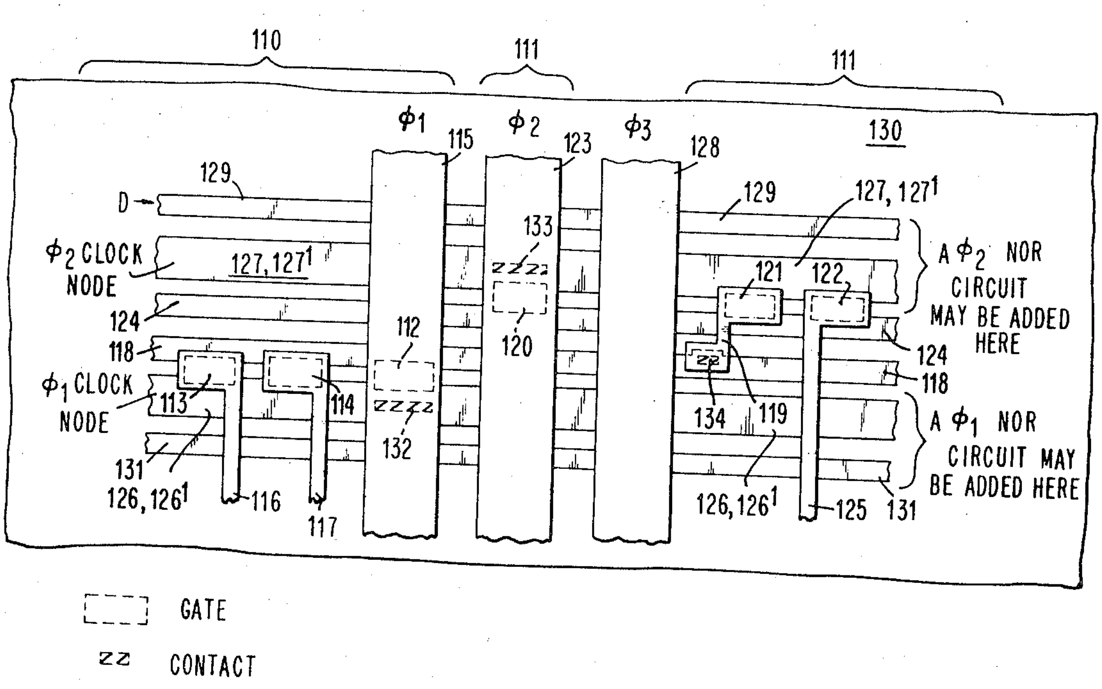

FIG. 6A shows two interconnected NOR stages 110 and 111 to be placed on a single chip layout using parallel diffusions with metal interconnections made by metallization depositions over the NOR diffusions as shown in FIG. 6C in detail and described below.

In FIG. 6A, the first NOR stage 110 includes FET 112 connected at its drain and at its gate to $\phi_1$ at line 115 and FET's 113 and 114 connected at their sources to $\phi_1$ at line 115$^1$. Gate 116 of FET 113 and gate 117 of FET 114 are to be connected to the signals to be tested by NOR stage 110. The respective source and drains of the FET's are connected to output line 118.

The second NOR stage 111 includes FET 120 whose gate and drain are connected to $\phi_2$ line 123 and FET's 121 and 122 whose sources are connected to phase clock signal $\phi_2$ on line 123$^1$. The input line 119 to the gate of FET 121 is connected to the output line 118 of NOR stage 110. The input 125 of FET 122 is intended to be connected to another signal to be tested by NOR stages 110 and 111. The respective source and drains of the FET's 120, 121, and 122 are connected to output line 124.

In FIG. 6B, the same circuit described above is rearranged slightly geometrically to correspond to the configuration of the actual FET MOS layout shown in FIG. 6C.

In FIG. 6C there are shown six horizontal diffusion strips 129, 127, 124, 118, 126, and 131 on a substrate 130. There are three clock phase lines 115, 123, and 128 which are parts of a layer of metallization applied over the diffusions after they have been protected with a layer of insulation. Note that there are windows 132 and 133 in the insulation which provide electrical contact between clock phase lines 115 and 123 respectively with $\phi_1$ clock diffusion 126, 126$^1$ and $\phi_2$ clock diffusion 127, 127$^1$ which run normal to the clock phase lnes. Additional vertical strips of metallization comprise the lines 116, 117, 119, and 125 which connect signals to the gates formed together with the metallization of FET's 113, 114, 121 and 122. The gates of FET's 112 and 120 are formed integrally in the metallization of clock lines 115 and 123. Contact between diffusion line 118 and metallization line 119 is made at hole 134 in the layer of insulation between the diffusion and metallization. Clock phase line 128 for $\phi_3$ is shown to illustrate that a set of three clock lines are adapted to be connected in the center of a set of horizontal diffusions. Diffusions 129 and 131 show where additional $\phi_1$ and $\phi_2$ circuits can be added.

In FIG. 6C the two circuits lie in the same column and can be connected vertically. See the description related to FIG. 7 below for definition of a column. If they did not lie in the same column, horizontal interconnection would be required. To minimize the length of interconnection in that situation, the contact on diffusion 118 would probably be located on either the extreme right or left hand side depending on the location of the other circuit. The input gates 113, 114, 121, 122 can be relocated horizontally along the diffusions with no change in the circuit functions. The same holds true for the clock inputs 115, 123, 128 provided the clock diffusion is wide enough to allow spacing for the contact hole and gates.

Figure 7:
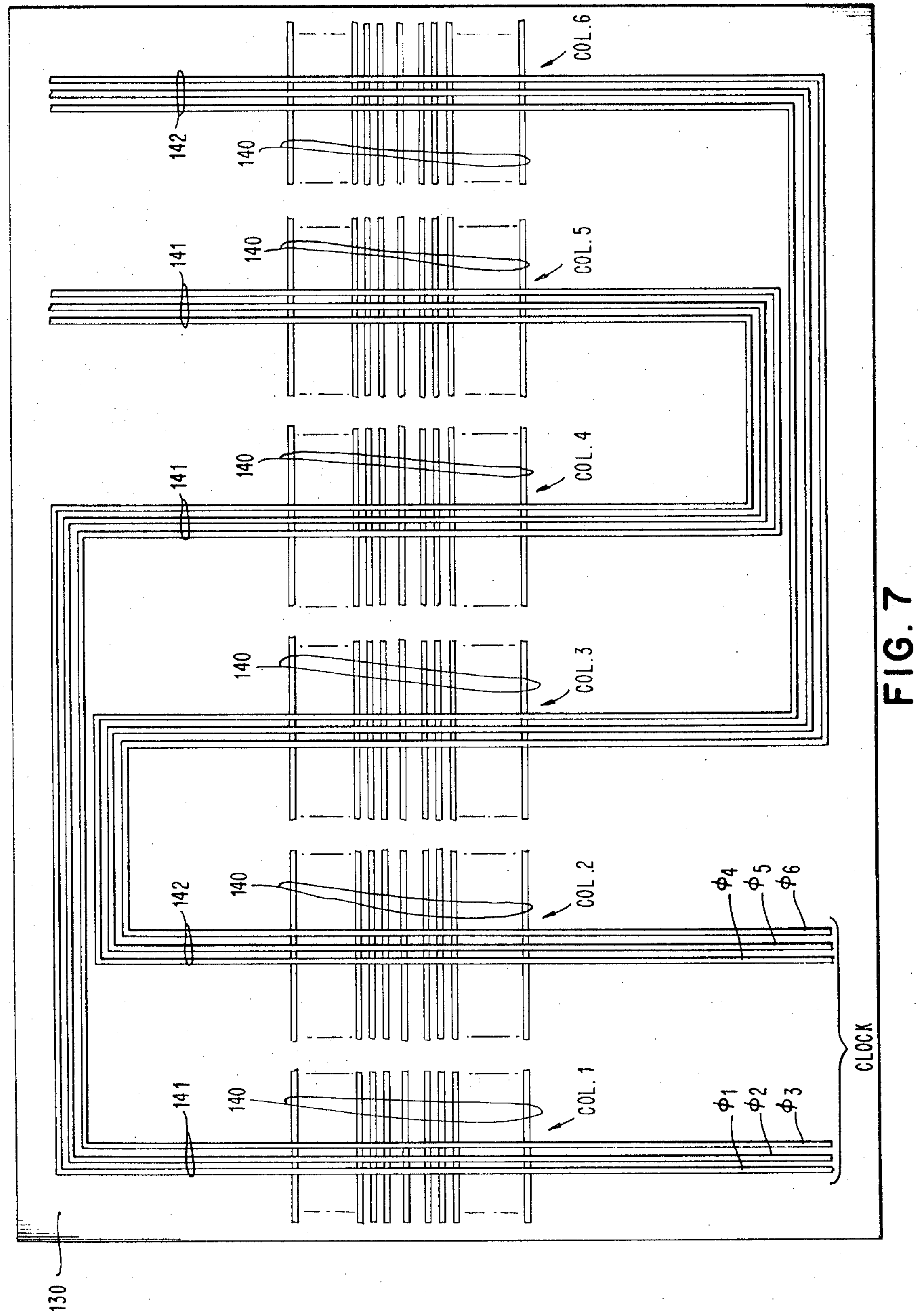
FIG. 7 shows an overall view of diffusion lines on a substrate with the clock phase lines of metallization overlaid over a layer of insulation to provide a multiphase arrangement.

An array of these NOR cells can be layed out in columns so that all diffusions run horizontally as in the Weinberger U. S. Pat. No. 3,475,621. A six phase dynamic chip layout of this type is illustrated in FIG. 7. There are six stacks or columns 140 of horizontal diffusions each column containing there clock lines 141 or 142 running vertically along the center of the column, with phase lines shown. Any other selection of phase lines desired may be substituted.

NAND and AND-OR-INVERT single stage circuits may also be placed in this layout scheme by modifying the diffusion patterns and by placing more restrictions on the location of the input gates and output contact.

The silicon area required for these circuits would be greater than for a NOR circuit.

The chip image described relative to FIG. 7 etc. has the following characteristics. 1. Logic circuits are layed out in parallel columns so that diffusions run horizontally and metal interconnection can be either horizontal or vertical over the circuits. 2. Clock phase lines run vertically along the center of each column of circuits and each stage connects to only one clock line. Thus three clock lines in a column permit each stage in that column to be one of three possible types. 3. There is no physical boundary between adjacent columns. Thus the width of any circuit in a column 140 in FIG. 7 may be increased (decreased) provided the widths of adjacent circuits in adjacent columns are decreased (increased). 4. The clock node diffusion may be shared by adjacent NOR stages of the same type permitting two NOR stages per 3 diffusions. 5. Underpass diffusions are not required when interconnecting circuits in adjacent columns, so many intercolumn crossings can be made. 6. Stages in each column can be one of three possible types, since there are three clock lines in each column and a given stage requires only one. Each stage can be placed in three out of the six columns.

Figure 8:
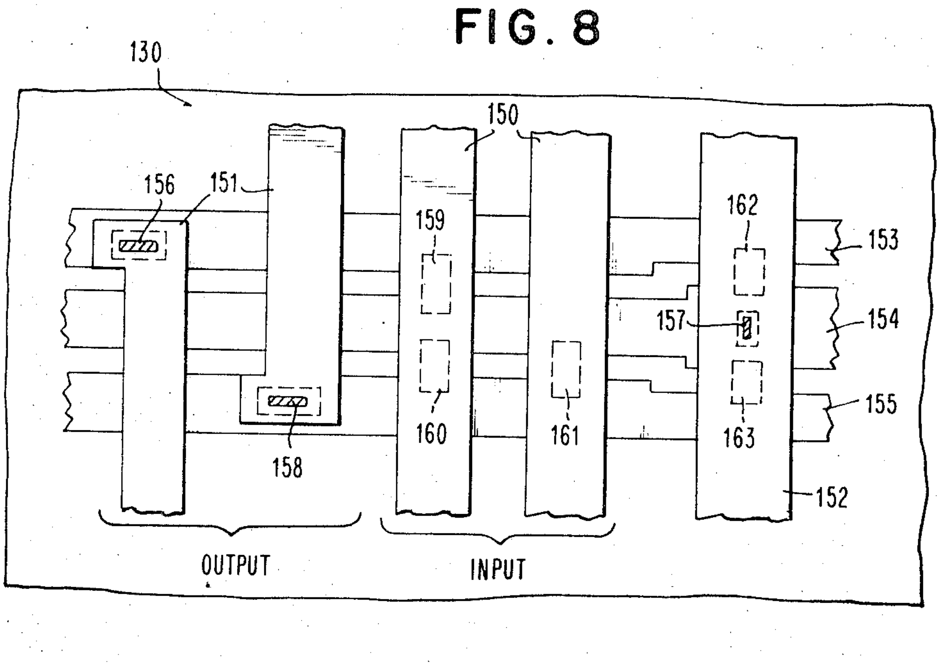
FIG. 8 shows the layout of two NOR circuits formed on a substrate.

FIG. 8 shows a layout of the two NOR stages sharing a center diffusion. The vertical metallizations include inputs 150, outputs 151 and phase clock line 152. The horizontal diffusions 153, 154, and 155 are contacted at 156, 157, and 158. Gates are formed on line 150 at 159 and 160, on line 150 and 161 and on line 152 at 162 and 163. Note again that the contact holes 156 and 158 for the output metallization can be placed anywhere along the lengths of diffusions 153 and 155, provided the physical layout rules are not violated. As in FIG. 6, the input gates can be moved also.

Figure 9:
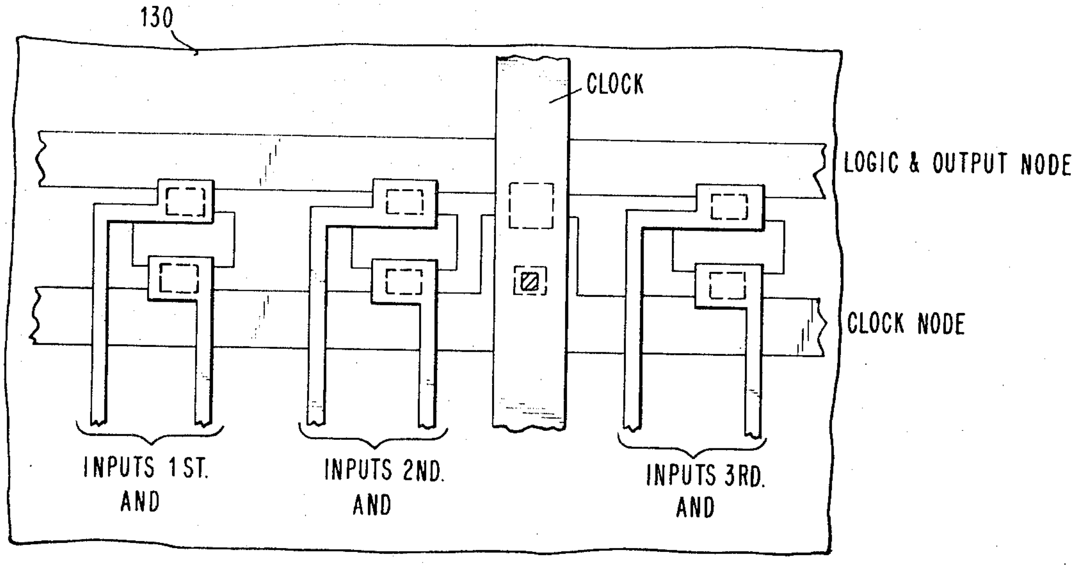
FIG. 9 shows the layout of an AND-OR-INVERT circuit designed in accordance with this invention.

FIG. 9 shows the layout of an AND-OR-INVERT circuit in accordance with this invention.

What is claimed is:

1. A set of field effect transistor circuits formed upon a single semiconductor substrate of a first conductivity type comprising a plurality of diffusions of a semiconductor material of opposite conductivity type upon said substrate in substantially parallel relationship including a plurality of interconnected stages of FET devices with a plurality of FET devices per stage, a plurality of dynamic logic clock phase lines extending in transverse relationship with respect to said diffusions and connected to said diffusions and forming FET gates with said diffusions, and a plurality of coupling lines, said clock phase lines and coupling lines forming gates or contacts with said diffusions being superposed upon said diffusions said clock phase lines being connected to a source of clock signals recurring in a regular predetermined sequence.

2. Apparatus in accordance with claim 1 including a plurality of stages of transistor circuits, with only one clock phase line connected to the gate and one other electrode of an FET device in each stage, wherein a stage includes at least two FET devices formed by a pair of parallel diffusions with at least one gate formed by said clock phase line between said diffusions and a coupling line for connection to a source of data, said coupling line also forming the gate of another FET of said stage.

3. A set of circuits in accordance with claim 1 wherein said clock phase lines cross said diffusions intermediate opposite ends thereof.

4. A multi-stage FET circuit configuration including a plurality of stages having a plurality of clock phase input lines, with a pair of FET devices in each stage, with the drain and gate of one FET and the source of the other FET connected to the clock phase input line of the stage, and the remaining source of the one FET and drain of the other FET connected together and having a data output therefrom, with a data input to the gate of the other FET, each of said clock phase input lines being adapted to be connected to a plurality of clock phase signals supplied in a cyclical fashion with n clock phase intervals per cycle where $n \geq 5$, with only one clock phasesignal occurring for each said interval with a first plural FET stage of the circuit having a plurality of FET devices, connected to a first clock phase signal with the output of said first stage connected to the input of a second plural FET stage having a plurality of FET devices connected to a clock phase signal occurring $\alpha$ clock phase intervals later than said first clock phase signal, where $\alpha$ is an integer greater than zero and less than $b$ clock pulse intervals, and $b$ is an integer greater than $\alpha$ and less than or equal to four, with some successive stages connected to nonconsecutive clock phase signals.

5. Apparatus comprising a plurality of FET, semiconductor circuits formed on a single substrate, said circuits including a plurality of interconnected stages of FET devices wherein each stage includes a pair of FET devices, with the drain and gate of one FET and the source of the other FET connected to the clock phase input line of the stage and the remaining source of the one FET and drain of the other FET connected together and having a data output therefrom, with a first data input to the gate of the other FET, said circuits including a plurality of clock lines and a plurality clock line terminals, time being divided into $n$ clock phase intervals per cycle, where $n$ is an integer greater than 4, only one clock line being connected to control each of said stages of said circuits with the output of each said stage being connected to another one of said stages controlled by different one of said clock lines with the clock lines having a cyclical sequence of clock phase signals thereon with the output of a first stage connected to the input of a second stage having a clock phase signal which occurs $\alpha$ clock phase intervals later than the clock phase signal of the first stage where $\alpha$ is an integer greater than zero and less than $b$, where $b$ is an integer less than or equal to $n-2$ and greater than zero, and the output of the second stage is connected to the input of a third stage having a clock phase signal which occurs b clock phase intervals later than the clock phase signal of the first stage, with at least some successive staes connected to nonconsecutive clock phase signals.

6. A set of FET circuits combined into a system including separate stages of FET circuits and a plurality of clock phase lines wherein at least two FET devices are included in each stage and a single one of said clock phase lines is connected to each stage, wherein at least two interconnected stages are connected to clock phase lines which are nonconsecutive, each stage including an FET device having its gate and one other electrode connected to one of said clock phase lines and having its third electrode connected at a junction to an electrode other than the gate of a second FET device with said gate of said second FET device adapted to be connected to a source of data.

7. Apparatus in accordance with claim 6 wherein said junction is adapted to be connected to the gate of another stage.

8. Apparatus in accordance with claim 6 wherein an FET device having one of its electrodes other than its gate connected to said clock phase line and the remaining one of its electrodes connected in a series circuit with said third electrode of said first FET.

* * * * *